United States Patent [19]

Ando

[11] Patent Number: 5,214,007

[45] Date of Patent: May 25, 1993

[54] PRODUCTION PROCESS FOR SILICON NITRIDE SINTERED BODY

[75] Inventor: Masayasu Ando, Anjo, Japan

[73] Assignee: Aisin Seiki Kabushiki Kaisha, Kariya, Japan

[21] Appl. No.: 871,590

[22] Filed: Apr. 20, 1992

Related U.S. Application Data

[63] Continuation of Ser. No. 330,282, Mar. 29, 1989, abandoned.

[30] Foreign Application Priority Data

Mar. 31, 1988 [JP] Japan .................................. 63-80291

[51] Int. Cl.$^5$ .............................................. C04B 35/58
[52] U.S. Cl. ......................................... 501/95; 501/97
[58] Field of Search ..................................... 501/95, 97

[56] References Cited

U.S. PATENT DOCUMENTS

| | | | |
|---|---|---|---|
| 4,365,022 | 12/1982 | Tabata et al. | 501/97 |
| 4,388,085 | 6/1983 | Sarin et al. | 501/97 |
| 4,521,393 | 6/1985 | Saito et al. | 423/406 |
| 4,612,296 | 9/1986 | Sakamoto et al. | 501/97 |
| 4,711,860 | 12/1987 | Gadkaree et al. | 501/9 |
| 4,717,693 | 1/1988 | Wittmer | 501/95 |
| 4,753,764 | 6/1988 | Kamijo et al. | 501/90 |
| 4,879,263 | 11/1989 | Komeya et al. | 501/97 |
| 4,886,767 | 12/1989 | Goto et al. | 501/97 |

OTHER PUBLICATIONS

Lange, F. F., "Fabrication and Properties of Dense Polyphase (1983). Silicon Nitride", Ceramic Bulletin, vol. 62, No. 12, pp. 1369-1374.

Nose et al., "Evaluation of Fracture Toughness for Ceramic Materials by a Single-Edge-Precracked Beam Method," *Journal of the American Ceramic Society*, 71[5] 328-33 (1988).

Niihara et al., "Further Reply to Comment on 'Elastic/Plastic Indentation Damage in Ceramics: The Median/Radical Crack System'", *Communications of the American Ceramics Society*, C-116 (Jul. 1982).

Singh et al., "Fracture Toughness and Strength of SiC--Whisker-Reinforced $Si_3 N_y$ Composites", Advanced Ceramics Materials, 3[4], pp. 357-360 (1988).

"Mechanical Properties of Silicon Nitride Ceramic Composite Reinforced Carbide Whisker", K. Ueno et al., The Ceramic Industry Association pp. 491-497, Government Industrial Research Institute, Osaka, Japan.

"Whiskers", George A. Hoffman, Journal of Melts, pp. 591-595.

*Primary Examiner*—Karl Group
*Attorney, Agent, or Firm*—Burns, Doane, Swecker & Mathis

[57] ABSTRACT

A process for producing silicon nitride sintered body of this invention comprises a) molding raw material powder mainly comprising silicon nitride powder and beta-silicon nitride whiskers; and b) sintering molded body obtained. The silicon nitride sintered body produced by the process of this invention is highly sinterable and dense and has excellent toughness.

13 Claims, No Drawings

PRODUCTION PROCESS FOR SILICON NITRIDE SINTERED BODY

This application is a continuation of application Ser. No. 07/330,282, filed Mar. 29, 1989 now abandoned.

BACKGROUND OF THE INVENTION

1. Field of the Invention

This invention relates to silicon nitride sintered body of high toughness. This silicon nitride sintered body of high toughness can be utilized as component members of engines such as gas turbine engines, reciprocating engines, diesel engines, and the like. Further, the silicon nitride sintered body of high toughness can be utilized as a material for turbine rotors for superchargers.

2. Description of the Prior Art

As described in Yogyo-Kyokai-Shi (The Ceramic Industry Association Magazine) vol. 91, published in November, 1983, a process has been known to improve mechanical strength of silicon nitride sintered body, in which silicon carbide whiskers are mixed into silicon nitride powder, the mixture is molded and then hot-pressed.

Because the above-mentioned conventional process utilizes the silicon carbide whiskers as fibers for reinforcing the silicon nitride matrix, the conventional process produces one of fiber reinforced ceramics which have been known already by mixing the silicon nitride with the silicon carbide whiskers and then by molding and sintering the mixture. In this fiber reinforced ceramic, only the good mechanical strength of the silicon carbide whisker is utilized, and the silicon nitride as the matrix is utilized as it is, but the silicon nitride itself is not modified at all.

SUMMARY OF THE INVENTION

Therefore, it is an object of this invention to facilitate generation of acicular or columnar crystals of silicon nitride generating in sintering, thereby producing silicon nitride sintered body of high toughness.

A process for producing silicon nitride sintered body of this invention comprises: a) molding raw material powder mainly comprising silicon nitride powder and beta-silicon nitride whiskers; and b) sintering obtained molded body.

This invention has been developed in view of the facts that it is possible to obtain a sintered body comprising beta-silicon nitride of acicular or columnar crystal structure (hereinafter simply referred to as acicular crystal structure) by sintering the silicon nitride powder, and that the toughness of the sintered body is improved because the aspect ratio of the acicular crystal structure, especially of the acicular crystals, increases. Namely, beta-silicon nitride whiskers can be utilized as cores for crystals generating during the sintering and crystallizing of the silicon nitride powder when the beta-silicon nitride whiskers are mixed in the raw material as a part thereof. This is possible because the crystal structure of the beta-silicon nitride whiskers is identical with the crystal structure of the silicon nitride sintered body to be obtained. Accordingly, finer and longer acicular crystals, i.e., acicular crystals of higher aspect ratios, are formed to increase the toughness of the sintering body to be obtained.

The raw material powder of this invention mainly comprises silicon nitride powder and beta-silicon nitride whiskers. For the silicon nitride powder, conventional silicon nitride powder which has been used for the conventional production of silicon nitride sintered body may be utilized as it is. Similarly, for the beta-silicon nitride whiskers, conventional beta-silicon nitride whiskers which have been known already may be utilized as they are. The whiskers may have an aspect ratio greater than 50 or between 50 and 200. Further, alumina, yttria, spinel, and the like which have been known for a sintering assistance agent for conventional silicon nitride sintered body may be utilized for the production of silicon nitride sintered body of this invention as they are utilized in the conventional production of silicon nitride sintered body.

The mixing amount of the beta-silicon nitride whiskers is preferably 1 weight % or more with respect to the total of the raw material powder taken as 100% by weight. The more the mixing amount of the beta-silicon nitride whiskers increases, the more the toughness of thus obtained silicon nitride sintered body improves at stake of sinterability, however. The deterioration of the sinterability resulting from the mixing of the beta-silicon nitride whiskers can be overcome by carrying out hot-pressing and HIP (Hot Isostatic Pressing) sintering. The amount of the sintering assistance agent may fall in the mixing amount range utilized for the conventional production of silicon nitride sintered body.

For the sintering method, the following may be employed: atmospheric pressure sintering, hot-pressing, HIP (Hot Isostatic Pressing) and gas pressure sintering. The heating and pressurizing conditions may be identical with the heating and pressurizing conditions for the conventional silicon carbide sintering.

Thus, the obtained silicon nitride sintered body comes to have beta-silicon nitride crystal structures of well grown acicular crystals. The beta-silicon nitride whiskers mixed in the raw material beforehand are buried in the matrix of the beta-silicon nitride crystals of the same acicular crystal structure. However, the beta-silicon nitride whisker can be recognized with an electron microscope and the like, because it is generally larger than the acicular silicon nitride crystals generated by sintering. This silicon nitride sintered body has good toughness. Further, because the beta-silicon nitride whiskers and the silicon nitride powder comprises the silicon nitride of the same kind, it is possible to produce the silicon nitride sintered body of higher sinterability and density compared to sintered bodies obtained by sintering the silicon nitride powder and whiskers of the other kinds.

When the silicon nitride powder containing the beta-silicon nitride whiskers is subjected to sintering, the surfaces of the particles of the silicon nitride powder melt together, and the liquid phase generates, and the sintering starts. Recrystallization starts simultaneously with the start of the sintering, and the beta-silicon nitride whiskers work as crystal cores for facilitate the recrystallization. In this way, the sintered body thus obtained comes to have crystal structures of finer and longer (greater aspect ratio) acicular beta-silicon nitride.

DESCRIPTION OF THE PREFERRED EMBODIMENTS OF THE INVENTION

Twelve (12) sintered bodies Nos. 1 through 12 were produced as follows.

First, the composition listed in Tables 1 through 3 was prepared by the following raw materials:

Alpha-silicon nitride powder of an average particle diameter of 0.5 micrometer, yttrium oxide powder of an average particle diameter of 1.2 micrometers, aluminum-magnesium spinel powder of an average particle diameter of 0.3 micrometer, and beta-silicon nitride whiskers of a diameter of 0.1 to 0.4 micrometer and of a length of 5 to 20 micrometers were prepared for Nos. 2 through 6, i.e., preferred embodiments of this invention, having the composition listed in Table 1.

molded bodies was molded by ISP (IsoStatic Pressing) method in which a hydrostatic pressure of 2 ton/cm² was applied to the disk-shaped molded bodies. Finally, under nitrogen gas atmosphere of 1 atm, each of the disk-shaped molded bodies was heated to 1750° C. to sinter for 3 hours.

Each of the sintered bodies thus obtained were measured on its relative density (a percentage value against relative density of beta-silicon nitride taken as 100%)

TABLE 1

| No. | $Si_3N_4$ powder amount (wt. %) | $Y_2O_3$ addition amount (wt. %) | Spinel addition amount (wt. %) | $\beta$-$Si_3N_4$ whisker addition amount (wt. %) | Relative density (%) | Porosity (%) | $K_{IC}$ $(MN/m^{3/2})$ |
|---|---|---|---|---|---|---|---|
| 1 | 90 | 5 | 5 | 0 | 98.0 | 0.24 | 5.4 |
| 2 | 89 | 5 | 5 | 1 | 98.3 | 0.21 | 5.6 |
| 3 | 88 | 5 | 5 | 2 | 98.2 | 0.22 | 6.2 |
| 4 | 85 | 5 | 5 | 5 | 96.9 | 0.26 | 6.9 |
| 5 | 80 | 5 | 5 | 10 | 94.2 | 0.47 | 6.6 |
| 6 | 75 | 5 | 5 | 15 | 91.2 | 0.56 | 7.3 |

TABLE 2

| No. | $Si_3N_4$ powder amount (wt. %) | $Y_2O_3$ addition amount (wt. %) | Spinel addition amount (wt. %) | $\beta$-SiC whisker addition amount (wt. %) | Relative density (%) | Porosity (%) | $K_{IC}$ $(MN/m^{3/2})$ |
|---|---|---|---|---|---|---|---|
| 7 | 85 | 5 | 5 | 5 | 96.8 | 0.31 | 6.2 |
| 8 | 80 | 5 | 5 | 10 | 88.7 | 2.82 | — |
| 9 | 75 | 5 | 5 | 15 | 86.7 | 7.88 | — |

TABLE 3

| No. | $Si_3N_4$ powder amount (wt. %) | $Y_2O_3$ addition amount (wt. %) | Spinel addition amount (wt. %) | $\alpha$-$Si_3N_4$ whisker addition amount (wt. %) | Relative density (%) | Porosity (%) | $K_{IC}$ $(MN/m^{3/2})$ |
|---|---|---|---|---|---|---|---|
| 10 | 85 | 5 | 5 | 5 | 96.7 | 0.31 | 5.8 |
| 11 | 80 | 5 | 5 | 10 | 94.5 | 0.45 | 6.1 |
| 12 | 75 | 5 | 5 | 15 | 91.1 | 0.60 | 5.6 |

The same alpha-silicon nitride powder, yttrium oxide powder and aluminum-magnesium spinel powder were also employed for Nos. 7 through 9, i.e, comparative examples, in the amounts listed in Table 2, but beta-silicon carbide whiskers of a diameter of 0.1 to 1.0 micrometer and of a length of 30 to 100 micrometers was employed for Nos. 7 through 9 in the amount listed in Table 2 instead of the beta-silicon nitride whiskers for Nos. 2 through 6.

The same alpha-silicon nitride powder, yttrium oxide powder and aluminum-magnesium spinel powder were also employed for Nos. 10 through 12, i.e., comparative examples, in the amounts listed in Table 3, but alpha-silicon nitride whiskers of a diameter of 0.1 to 1.6 micrometers and of a length of 5 to 200 micrometers were employed for Nos. 10 through 12 in the amount listed in Table 3 instead of the beta-silicon nitride whiskers for Nos. 2 through 6.

Then, the silicon nitride powder, yttrium oxide powder and aluminum-magnesium spinel powder were mixed in the composition listed in Tables 1 through 3, and each of these raw materials was further mixed with a ball mill. After dispersing each of the whiskers listed in Tables 1 through 3 with an ultrasonic generator, each of the whiskers was put into the ball mill. Then, each of the raw materials was further mixed with the ball mill for 2 hours to prepare each of the mixed and pulverized raw materials. Each of the raw materials thus obtained was respectively put into a cylinder-shaped mold of a diameter of 30 mm, and then compressed with a piston-shaped punch to make a disk-shaped molded body of a diameter of 30 mm and a thickness of 5 mm. After sealing each of the disk-shaped molded bodies with a rubber coat in a water-proof manner, each of the disk-shaped and porosity. After the measurements, one of the surfaces of each of the disk-shaped sintered body was polished to a mirror surface with diamond abrasive grains of an average particle diameter of 0.3 micrometer to obtain test specimens, and a fracture toughness ($K_{1C}$) was measured by the indentation microfracture method. The fracture toughness ($K_{1C}$) is one of physical property values applied to a material like ceramic which is fractured by the growth of cracks. The fracture toughness ($K_{1C}$) is a degree of resistance to the growth of cracks. The greater fracture toughness ($K_{1C}$) means that the cracks hardly grow and the ceramic hardly fractures. In this indentation microfracture method, a Vickers hardness tester was used, and thereby an indentation was formed on the mirror surface of each of the test specimens with an indenter of the Vickers hardness tester. The indentations were dents substantially agreeing with the indenter end of an inverted pyramidal form. A diagonal line length (2a) of each of the indentations, and a length of cracks (c), namely a length from the center of the indentation to the end of a crack appearing from an apex of the indentation, were measured to determine the toughness. 20 kg was applied to the indenter of the Vickers hardness tester, and the fracture toughness ($K_{1C}$) was determined by the following Niihara's formula:

$$(K_{1C}\phi/H\ a^{0.5})(H/E\phi)^{0.4}=0.129(c/a)^{-1.5}$$

where, "H" is hardness, "E" is Young's modulus, "$\phi$" is a constant of approximately 3, "2a" is the diagonal length of the indentations, and "c" is the length of the cracks.

The results of the measurement are also listed in Tables 1 through 3 along with the composition, relative density and porosity of the sintered bodies.

As it is apparent from Table 1 that the fracture toughness ($K_{1C}$) increases as the mixing amount of beta-silicon nitride whiskers increases.

Although the sintered body No. 7 containing the beta-silicon carbide whiskers by 5 weight % showed a high fracture toughness ($K_{1C}$) of 6.2, the sintered bodies Nos. 8 and 9 respectively containing the beta-silicon carbide whiskers by 10 and 15 weight % were not so tough that the fracture toughness could not be measured. Accordingly, in the case that the beta-silicon carbide whiskers were mixed in the raw material by 10 and 15 weight %, the sintered bodies which were so fragile that the fracture toughness could not be measured because of their poor sinterablity.

In the case that the alpha-silicon nitride whiskers were mixed in the raw material, the fracture toughness was improved by a lesser degree. The sinterability was not deteriorated so bad as the case that the beta-silicon carbide whiskers were mixed in the raw material, but the sinterablity was inferior to the case that the beta-silicon nitride whiskers were mixed in the raw material.

It is apparent from Tables 1 through 3 that mixing the beta-silicon nitride whiskers in the raw material effects to improve the toughness of the sintered body much better than mixing the other whiskers in the raw material did.

What is claimed is:

1. A process for producing a silicon nitride sintered body, comprising:
    a) molding raw material powder to form a molded body, said powder comprising silicon nitride powder and beta-silicon nitride whiskers; and
    b) sintering the resulting molded body.

2. A process for producing a silicon nitride sintered body according to claim 1, wherein the raw material powder comprises from about 1 to 15 weight % of said beta-silicon nitride whiskers with respect to the total of said raw material powder taken as 100 weight %.

3. A process for producing a silicon nitride sintered body according to claim 1, wherein the sintering pressure for the sintering step is atmospheric pressure.

4. A process according to claim 2, wherein the whiskers have diameters ranging from about 0.1 to about 0.4 micrometers and lengths ranging from about 5 to about 20 micrometers.

5. A process for producing a silicon nitride sintered body according to claim 1, wherein said beta-silicon nitride whiskers possess an aspect ratio of at least 50.

6. A process for producing a silicon nitride sintered body according to claim 1, wherein said beta-silicon nitride whiskers possess an aspect ratio of between 50 and 200.

7. A process for producing a silicon nitride sintered body, comprising:
    a) molding raw material powder to form a molded body, said powder comprising silicon nitride powder and beta-silicon nitride whiskers; and
    b) sintering the resulting molded body to produce a sintered body consisting essentially of said whiskers and beta-silicon nitride needle-shaped crystals.

8. The process according to claim 7, wherein said whiskers facilitate the formation of said beta-silicon nitride needle-shaped crystals.

9. The process according to claim 7, wherein the raw material powder comprises from about 1 to 15 weight % of said beta-silicon nitride whiskers with respect to the total of said raw material powder taken as 100 weight %.

10. The process according to claim 7, wherein the sintering pressure for the sintering step is atmospheric pressure.

11. The process according to claim 7, wherein the whiskers have diameters ranging from about 0.1 to about 0.4 micrometers and lengths ranging from about 5 to about 20 micrometers.

12. The process according to claim 7, wherein said beta-silicon nitride whiskers possess an aspect ratio of at least 50.

13. The process according to claim 7, wherein said beta-silicon nitride whiskers possess an aspect ratio of between 50 and 200.

* * * * *